Oct. 26, 1943.  R. COVER  2,332,894
CORN CUTTING MACHINE
Filed Dec. 18, 1940   7 Sheets-Sheet 2
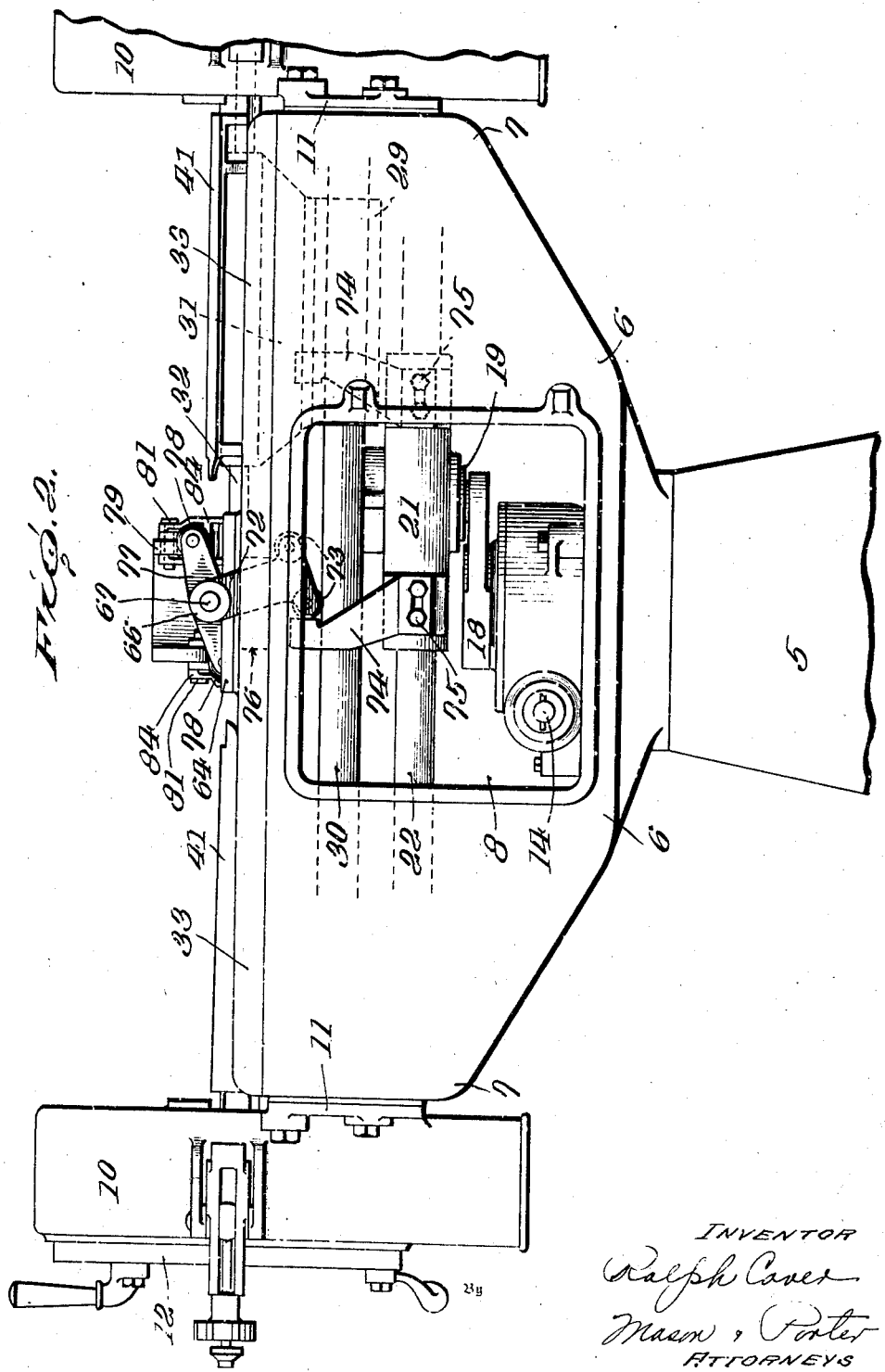
INVENTOR
Ralph Cover
Mason & Porter
ATTORNEYS

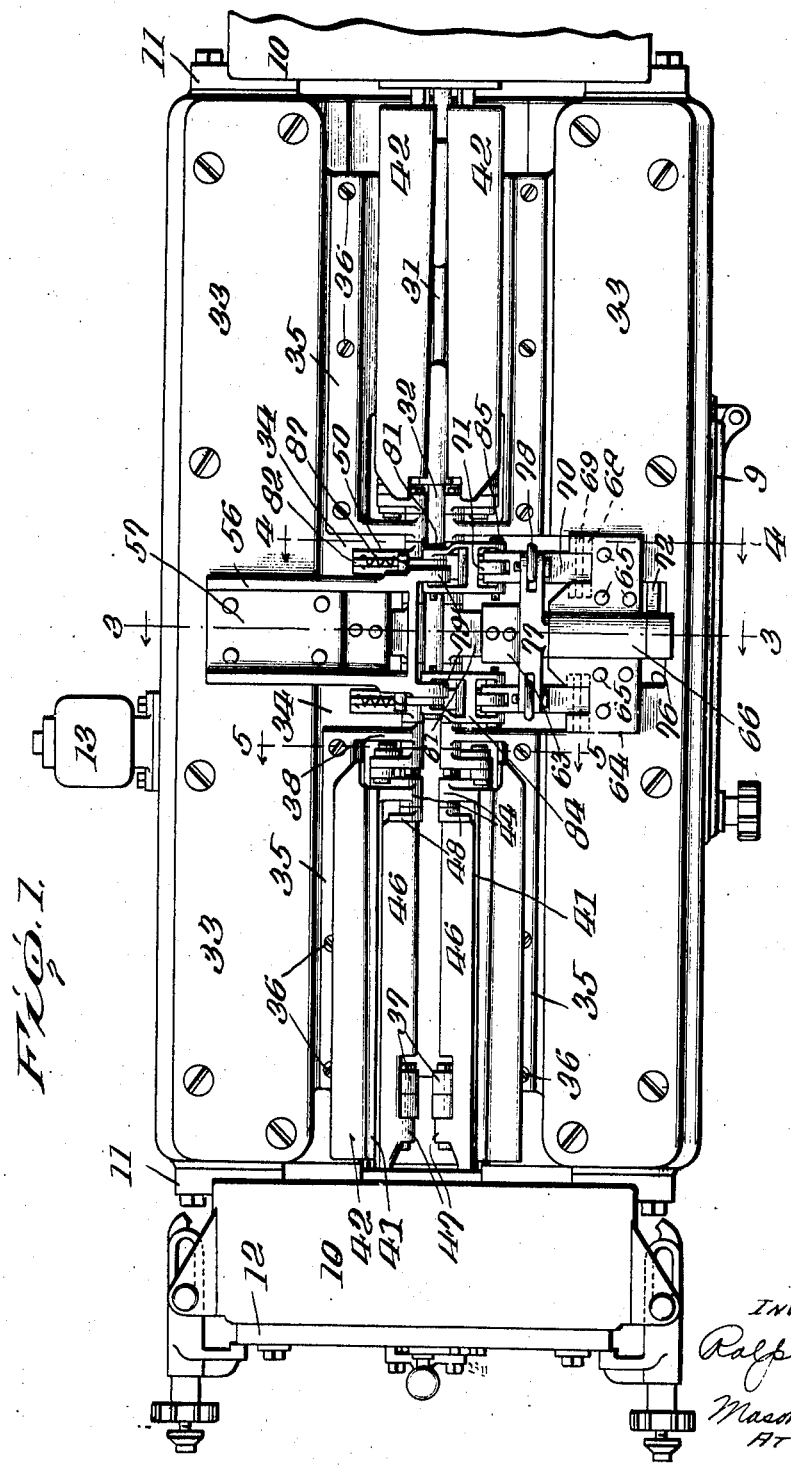

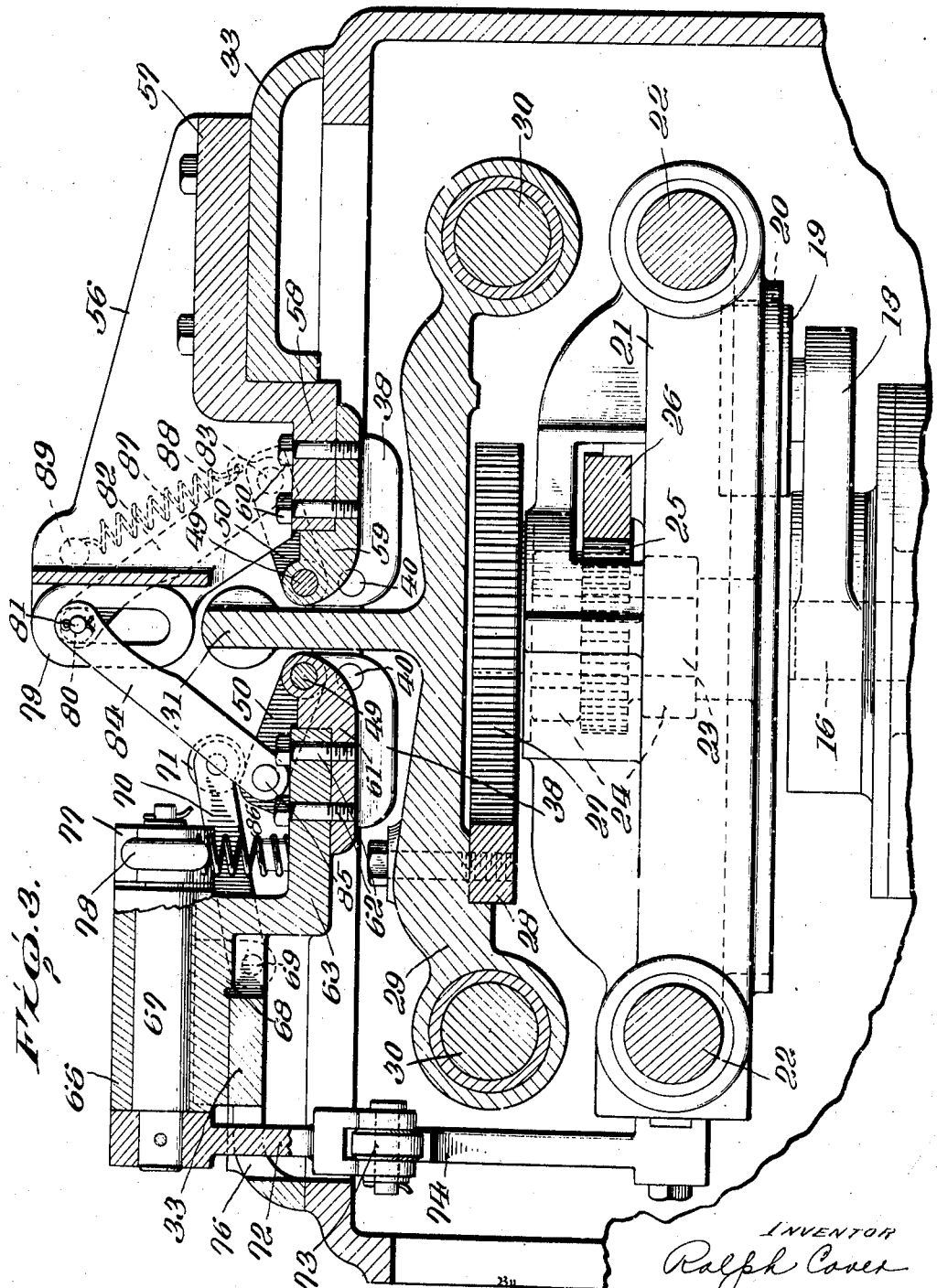

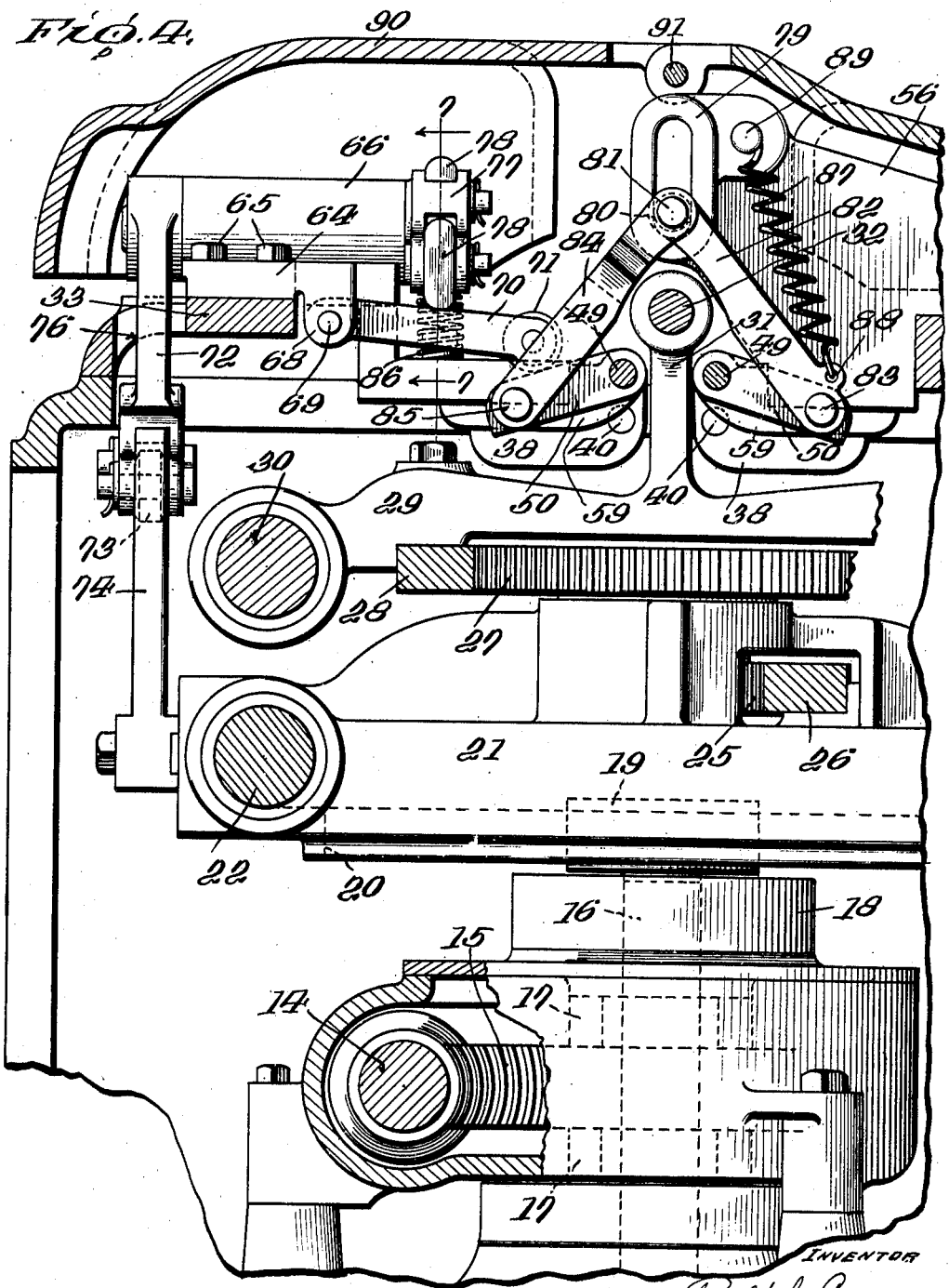

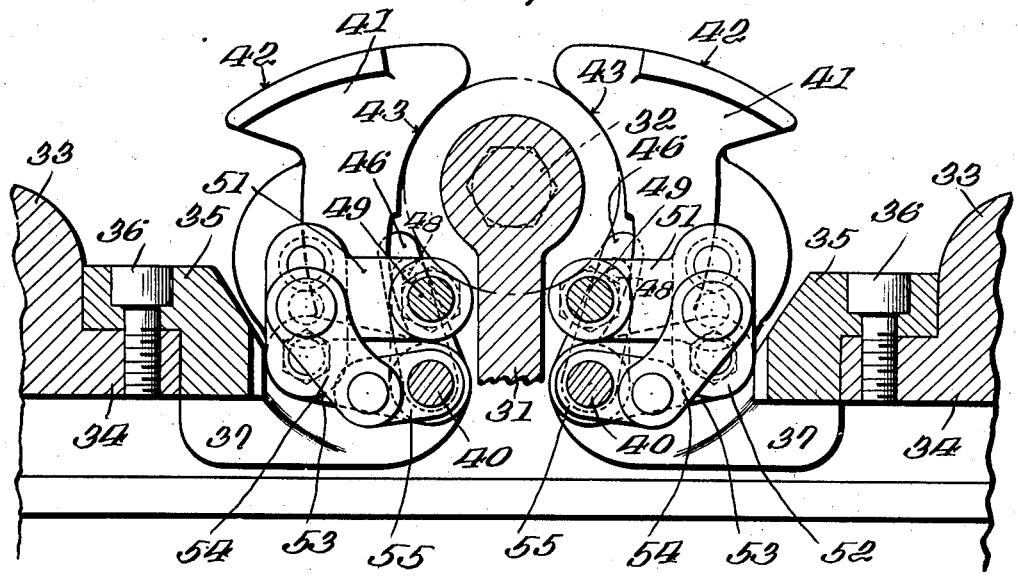
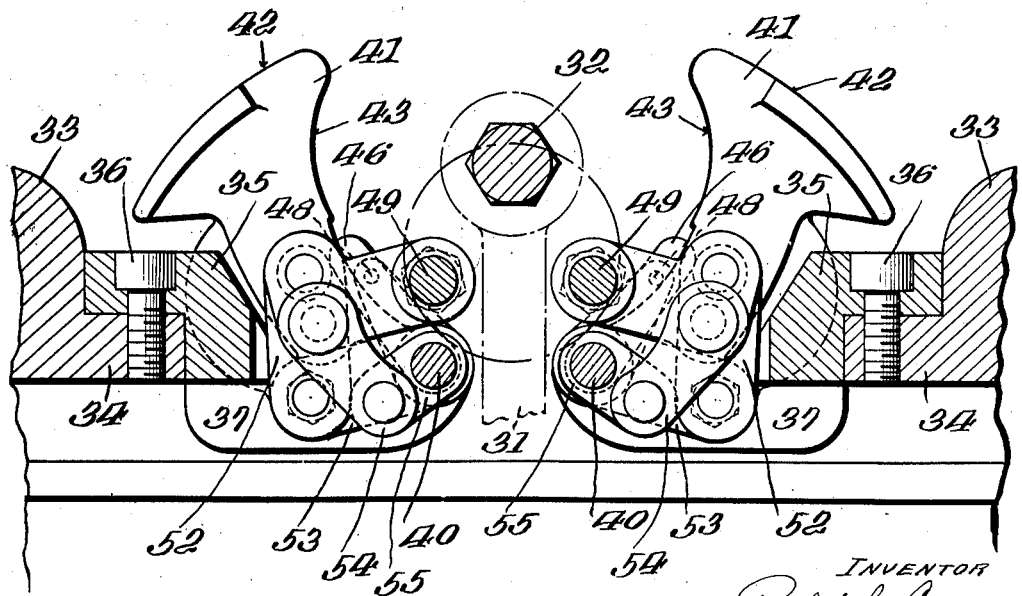

Oct. 26, 1943.    R. COVER    2,332,894
CORN CUTTING MACHINE
Filed Dec. 18, 1940    7 Sheets-Sheet 6

INVENTOR
Ralph Cover
By Mason & Porter
ATTORNEYS

Oct. 26, 1943.　　　　R. COVER　　　　2,332,894
CORN CUTTING MACHINE
Filed Dec. 18, 1940　　　7 Sheets-Sheet 7

INVENTOR
Ralph Cover
Mason & Porter
ATTORNEYS

Patented Oct. 26, 1943

2,332,894

UNITED STATES PATENT OFFICE 2,332,894

CORN CUTTING MACHINE

Ralph Cover, Westminster, Md.

Application December 18, 1940, Serial No. 370,703

2 Claims. (Cl. 130—9)

The invention relates generally to machines for cutting green corn kernels from the cobs on which they are grown, and it more particularly seeks to provide certain new and useful improvements in the corn holding and centering devices disclosed in the United States Letters Patent 2,001,457 issued to Frank W. Douthitt on May 14, 1935.

In the particular machine mentioned there is included an elongated frame, a cutter head mounted at each end of the frame, two sets of corn ear clamping or holding devices mounted in longitudinal alignment adjacent the respective ends of the machine, a reciprocating pusher which is alternately forced endwise through and then withdrawn from the aligned sets of clamping devices for forcing clamped corn ears from said devices into and through the cutter heads and then withdrawing to permit insertion of successive corn ears into said devices, and means for effecting an alternate opening and closing of the clamping devices in timed relation to the pusher movements so that the insertion of successive corn ears can be effected. The corn ear clamping and centering devices are in the nature of opposed, corn ear gripping and positioning blades or arms, and in the patented machine mentioned the clamping blades or arms are yieldably urged toward each other by spring actuated linkage and are positively separated by a reciprocating cam member only during the brief interval in the cycle of operation allotted to the insertion of corn ears between said blades or arms. No means are provided in that machine for positively holding the blades or arms in centered relation at all times, and it has been found that as a result of spring fatigue, or under uneven application of lateral pressures or stresses, the corn ear clamping devices have been free to wobble or move out of perfect alignment with the cutting devices at times, with the result that uneven cutting of the corn is effected. It is the purpose of the present invention to remedy this problem of uneven cutting and to assure perfect centering of the corn ear clamping devices and the corn ears clamped therein at all times.

It is, therefore, an object of the present invention to provide an improved corn cutting machine of the character stated in which is included novel means for positively and constantly holding the corn ear clamping devices in proper alignment with the cutting devices.

Another object of the invention is to provide an improved machine of the character stated in which each corn ear clamping device includes opposing corn ear engaging members and engaging member positioning links having a common connection in a fixedly disposed guide slot effective to prevent said members from at any time assuming unevenly spaced relations with respect to the axis on which corn ears are to be centered.

Another object of the invention is to provide novel means for effecting alternate opening and closing of the corn ear clamping or holding and centering devices at the respective ends of the machine.

Another object of the invention is to provide novel means for causing the corn ear clamping devices to dwell for a short interval in the open or separated position, thereby to make certain that corn ears deposited between the opposed clamping devices will lie at rest before said devices move together to perform their corn ear centering and clamping function.

With the above and other objects in view that will hereinafter appear, the nature of the invention will be more clearly understood by following the detailed description, the appended claims, and the several views illustrated in the accompanying drawings.

In the drawings:

Figure 1 is a plan view illustrating the improved machine, the corn ear feeder chute and feeder plate being removed.

Figure 2 is a side elevation of the machine, the side cover plate being removed and parts broken away.

Figures 3, 4 and 5 are enlarged fragmentary vertical cross sections taken respectively on the lines 3—3, 4—4, and 5—5 on Figure 1.

Figure 6 is a view similar to Figure 5 and shows the corn ear clamping and centering members in the closed or corn ear clamping and centering position.

Figure 7:
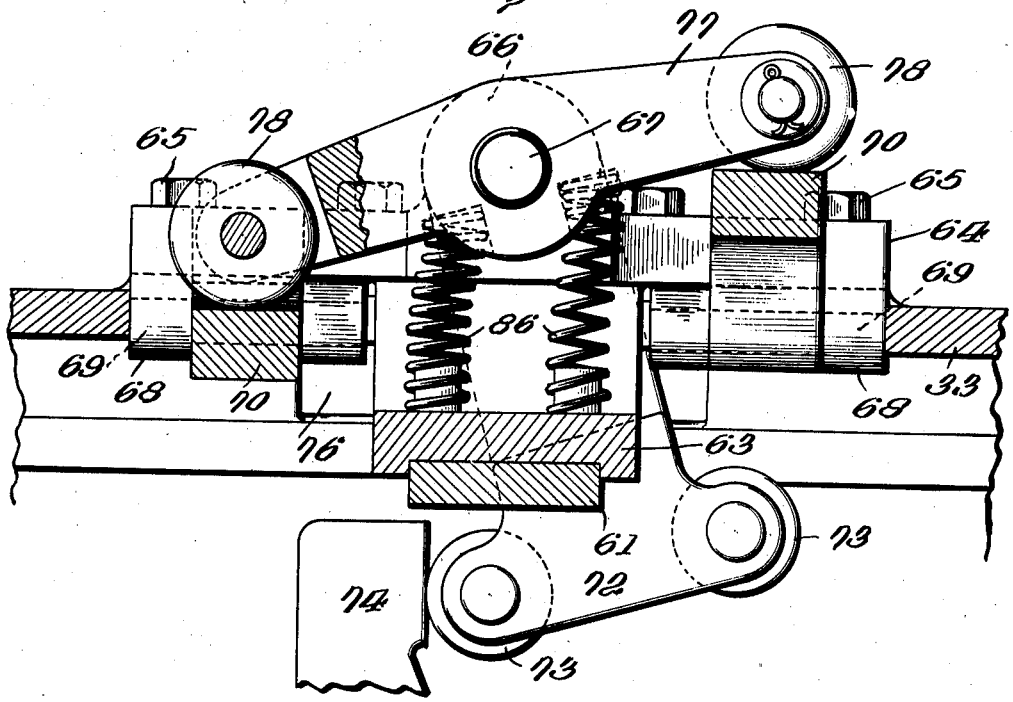

Figure 7 is a fragmentary vertical longitudinal section taken on the line 7—7 on Figure 4.

Figure 8:
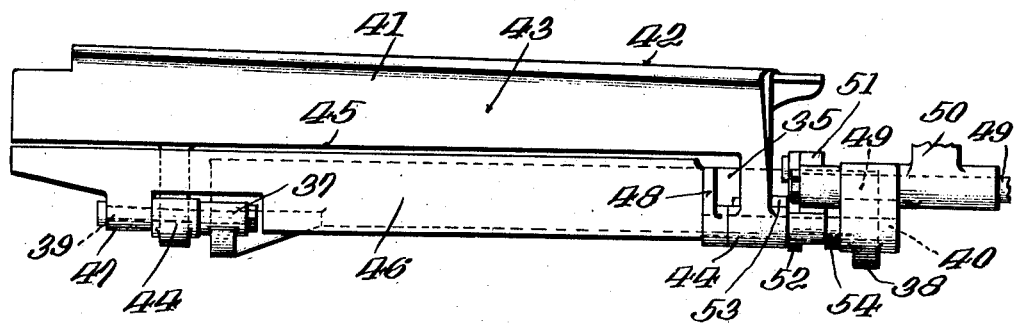

Figure 8 is a detail side elevation and part longitudinal sectional view illustrating the corn ear clamping and lifting members comprising one side portion of one of the corn ear clamping and centering sets.

Figure 9:
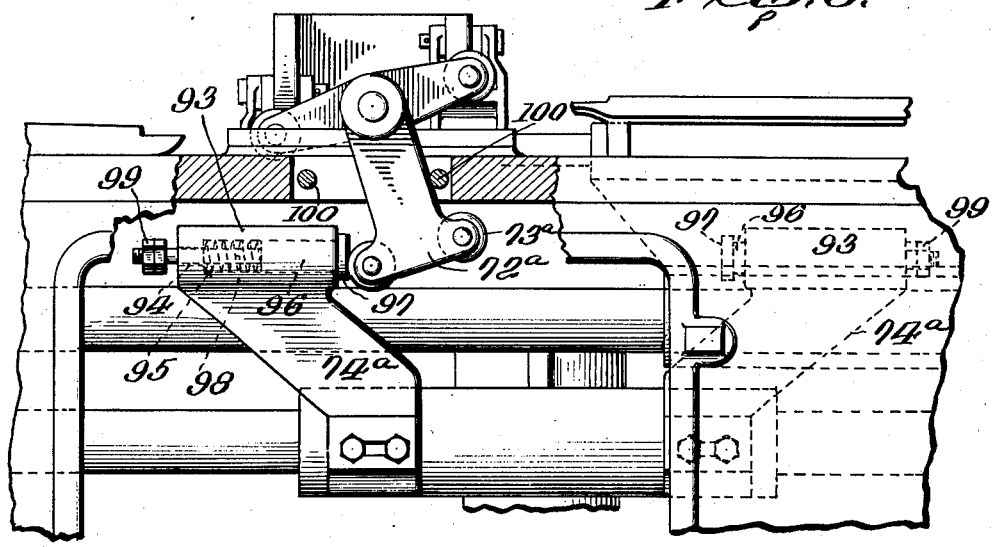

Figure 9 is a fragmentary side elevation illustrating the means for causing the corn ear clamping devices to dwell in the open position, parts being broken away and in section, and the dwell effecting spring plunger being illustrated at the position of maximum compression of the plunger spring.

Figure 10:
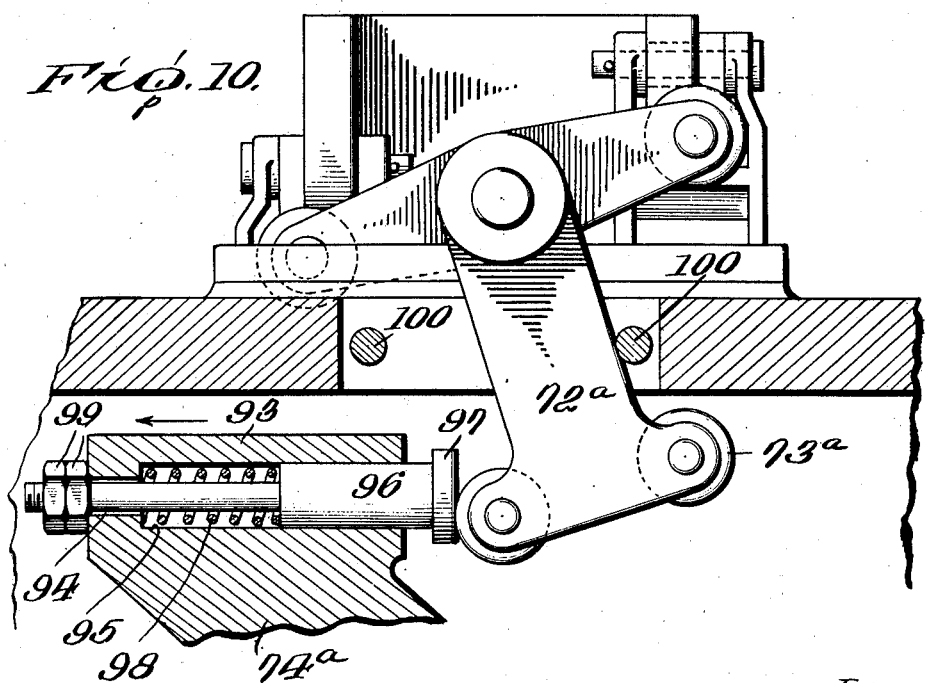

Figure 10 is an enlarged fragmentary view similar to Figure 9 and illustrating the plunger spring fully expanded and the plunger about to become disengaged.

The machine herein disclosed as an example of embodiment of the invention includes a base 5, and upon this base is mounted a head or body 6 including longitudinally extended end portions 7, and which is provided with an opening 8 through which access may be had to the interior of the head and which is normally closed by a door 9.

At each end 7 of the head there is mounted a bracket or casing 10 on which a cutter unit 12 is removably mounted. Individual ears of corn are alternately forced through these cutter units as hereinafter described for the purpose of cutting the kernels of the green corn from the cobs about which they grew. See Figures 1 and 2.

A drive motor 13 is fixed to the frame in the position illustrated in Figure 1 of the drawings with the drive-shaft thereof disposed horizontally. The motor drive-shaft carries, or is connected in drive relation with a worm gear 14, which meshes with a worm wheel 15 mounted upon a vertically disposed shaft 16 rotatable in suitable bearings in a fixedly mounted casing 17. See Figures 2, 3, and 4 of the drawings.

At its upper end the shaft 16 carries a crank 18 equipped with an upwardly directed roller 19 engageable in an elongated slot 20 formed in a lower cross-head 21 which is longitudinally slidable on guide rods 22 fixed in parallel spaced relation in the frame-head 6.

It will be observed by reference to Figure 3 of the drawings that the lower cross-head 21 carries a vertically disposed shaft 23 which is rotatable on suitable bearings 24 provided therefor in the cross-head, and this shaft 23 has affixed thereto a small spur-gear 25 which meshes with a longitudinal rack 26 fixedly supported in the frame-head 6 and a larger spur-gear 27 which meshes with a longitudinal rack 28 which is secured to the under surface of a second or upper cross-head 29 longitudinally slidable on guide rods 30 fixedly mounted in the head 6 and disposed directly above the previously mentioned guide rods 22. See Figures 2, 3, and 4 of the drawings.

When the motor 13 is being operated, the rotating crank equipment 18, 19 imparts reciprocatory movement to the lower cross-head 21 and, as this cross-head moves along the stationary rack 26, the rack imparts rotation to the small spur gear 25 which is transmitted through the vertical shaft 23 to the larger spur gear 27 at the upper end of this shaft. The rotating gear 27 imparts longitudinal movement to the rack 28 which is affixed to the cross-head 29, and in this manner the upper and lower cross-heads 21 and 29 are caused to reciprocate together. It will be apparent, however, that, because of the relative sizes of the gears 25 and 27, the upper cross-head is caused to move much more rapidly than the lower cross-head 21.

The upper cross-head 29 is provided with a central standard or upward projection 31 to which are affixed longitudinally directed corn ear pusher rods 32. One such pusher rod extends from the standard 31 toward each cutter head 12, and these rods are axially aligned with the cutter knives with which these heads are equipped. The rods 32 are of such length that, when the cross-head 29 is moved its maximum distance toward a given cutter head 12, the respective rod 32 will have moved axially through and slightly beyond the cutting blades of that cutter head.

All of the parts hereinbefore described are shown and described in U. S. Letters Patent 2,001,457 issued to Frank W. Douthitt on May 14, 1935, and additionally detailed description of these specific structures and the operation thereof is thought to be unnecessary.

A top plate 33 extends from end to end along each side at the top of the frame, and these top plates are laterally spaced to provide an intervening opening defined by mounting ledges formed at the innermost edges of the respective top plates 33 in the manner best illustrated in Figures 1, 5 and 6 of the drawings. Two mounting brackets 35 are mounted in longitudinally spaced relation at the respective ends of each ledge 34, said brackets being secured as at 36 upon said ledges. Thus mounted, the opposed pairs of brackets 35 provide an intervening center space in the manner best illustrated in Figure 1. At its end nearest the respective end 7 of the frame, each bracket 35 is equipped with an inwardly extended bearing arm 37. Each bracket is provided at its opposite end with an inwardly extended bearing arm 38. A pivot pin 39 is mounted in each bearing arm 37, and a pivot pin 40 is rockably mounted in each bearing arm 38. The pivot pins 39 and 40 of oppositely disposed brackets 35 serve to pivotally support opposed corn ear clamping members and associated corn ear supporting member which together serve to clamp and position corn ears in centered relation to the cutting knives at the respective end of the machine.

Each opposed set of corn ear clamping and supporting members includes two opposed clamping members and two opposed supporting and centering members, one such supporting member being associated with each clamping member, and each clamping member 41 has an upper curved corn ear receiving surface 42, an inner concave corn engaging clamping surface 43, and a pair of mounting arms 44 which are pivotally supported on the respective pivot pins 39 and 40. Each clamp member 41 is cut out longitudinally as at 45 to position and permit independent movement of the associated corn ear supporting or lifting member 46 which is pivotally supported at one end as at 47 on the respective pivot pin 39 and is fixed at its opposite end to the pivot pin 40 through the medium of a crank member 48. Thus mounted, each associated pair of clamping element 41 and lifter member 46 is mounted for rocking independently about common axes.

Another rocker pin is rockably mounted in each bearing arm 38 and has an actuator crank arm 50 fixed thereon. A second crank member 51 is fixed upon each rocker pin 49 and is link-connected as at 52 with a long crank portion extended from one arm 44 of the respective corn ear clamping member 41. This same crank member 51 is link-connected as at 54 at another point with a short crank member 55 fixed to the pivot pin 40. Thus it will be obvious that, as the actuator crank arm 50 is oscillated, it will rock the pin 49 and impart oscillation to the crank arm 51 affixed thereto and the movement of the crank 51 will be transmitted through the links 52 and 54 and the crank portions with which they connect to the corn ear clamping member 41 and the corn ear lifting and centering member 46. Because of the difference in length of these links and the crank portions with which they connect, the clamping member and the supporting member move differentially in effecting the clamping and supporting of the corn ears in centered relation to the respective cutter heads. The purpose and effect of this differential movement of the clamping and supporting elements is described in detail in the Douthitt Patent 2,001,457 hereinbefore referred to and need not be elaborated upon herein.

In the space intervening the longitudinal brackets 35 at one side of the machine, there is mounted a bracket member 56 which is secured as at 57 to the respective top plate 33. The bracket 56 includes a foot portion 58 depressed in the opening between the top plates 33, 33, and a bearing member 59 is secured as at 60 to said foot portion. The bearing member 59 forms a rigid support for one end of each of the rocker pins 49 which project longitudinally from the corn ear clamping and supporting equipments at that particular side of the machine in the manner hereinbefore described. A similar bearing member 61 is provided for the projecting rocker pins 49 of the corn ear clamping and supporting elements at the opposite side of the machine, and this bearing member is secured as at 62 to a foot portion 63 depending from a bracket 64 secured as at 65 upon the opposite top plate 33. See Figures 1, 3, and 4 of the drawings.

The bracket 56 includes a raised cross bearing 66 in which a shaft 67 is rockably mounted. The bracket 56 also includes two pairs of depending lugs 68 which support two pivot pins 69 on each of which is mounted one end of a depressing member or tappet 70. Each of the tappets 70 is bifurcated at its free end and carries a tappet roller 71 which engages the upper surface of one of the actuator members 50 disposed at that particular side of the machine. See Figures 1, 3 and 4.

The shaft 67 extends at both ends from the bearing 66, and at its outer end there is affixed a depending crank 72 which is bifurcated at its lower end and carries two spaced rollers 73. See Figures 2, 3, and 4. The rollers 73 are alternately engaged by actuator members 74 fixed as at 75 to one side of the lower cross-head 21, in the manner best illustrated in Figures 2, 3, and 4 of the drawings. The crank 72 extends through an aperture 76 in the top plate 33 at that side of the machine.

A cross-head 77 is fixed to the other extended end of the shaft 67 and has its ends bifurcated and equipped with tappet rollers 78 which alternately engage the tappet levers 70 as the cross-head 77 is rocked by movement of the shaft 67. See Figures 1 to 4 and 7.

The bracket 56 is equipped with vertically disposed slotways 79, each disposed above and intersecting the axis of the rods 32, or in other words the line on which the corn ears are fed in the centered relation to the cutter heads. Each slotway has a roller 80 slidably guided therein and mounted on a pin which projects at its ends from the slot and is connected with the upper end of a link 82 connected at its lower end as at 83 with the actuator arms 50 not engaged by tappet levers 70, and with a stirrup link 84 connected at its lower end as at 85 with the actuator arms 50 which are engaged by the tappet levers 70.

Equalizer springs 86 tend to hold the cross-head 77 in a horizontal position, and a spring 87 connected with each link 82 as at 88 and the bracket 56 as at 89 constantly tends to move the actuator arms 50 upwardly or in a direction for yieldably holding the corn ear clamping elements 41 and the associated supporting and centering members 46 against the corn ears.

A cover 90 preferably is provided for facilitating the feeding of corn ears to the corn ear clamping and centering equipment at each end of the machine. This cover is substantially the same in construction and purpose as the cover illustrated in the Douthitt Patent 2,001,457 except for the fact that it may be centrally longitudinally hinged as at 92 to enable the raising of one side thereof to render accessible portions of the mechanism underlying the same.

When the machine is in operation, the cross-heads 29 and 21 are reciprocated along the guide rods 30 and 22, the stroke of movement of the upper cross-head 29 being longer and the speed of movement of this cross-head more rapid than that of the lower cross-head 21 as hereinbefore stated. As the upper cross-head moves to one limit of its reciprocation, the pusher rod 32, movable with the cross-head toward that end of the machine, will engage a corn ear clamped and centered between the opposed members 41 and 46 at that end of the machine and will force the ear from the members 41 and 46 and through the respective cutter head. As the lower cross-head reaches the limit of its reciprocation in that particular direction, the respective actuator member 74 will engage the opposed roller 73 and rock the cross-head 77 so that the roller 78 at the trailing end thereof will be depressed so as to engage and depress the tappet lever 70 at the end of the machine opposite the end supporting the then effective cutter head. Depression of this tappet will effect a depression of both actuator crank arms 50 at that end of the machine because of the link-connections 82 and 84, and since the links 82 and 84 are positively connected through the medium of the pin 81, which is guided in the bracket slotway 79, a like degree of oscillation of the arms 50 is positively effected and assured. It will be understood that oscillation of the arms 50 imparts movement to the respective corn ear clamping and centering members 41 and 46 and, as the arms 50 are depressed, these members will be given movement of separation so that a corn ear can be received therebetween. As the cross-heads 21 and 29 move in the opposite direction, the previously depressed actuator arms 50 will be moved up by the spring 87, and the corn ear clamping and centering members 41 and 46 will be yieldably pressed against the sides of the corn ear to hold it in perfectly centered relation to the respective pusher rods 32 and the cutting knives of the respective cutter head 12. Upon continued reverse movement of the cross heads, the corn ear thus clamped will be forced out of the clamping and centering members 41 and 46 and through the respective cutter head 12, and the opposite actuator member 74 will function in the manner previously described to open the clamping and centering elements 41 and 46 at the opposite end of the machine.

In Figures 9 and 10 of the drawings have been illustrated novel means for causing the corn ear clamping devices to dwell for a short interval in the open or separated position, thereby to make certain that corn ears deposited between the opposed clamping devices will lie at rest before said devices move together to perform their corn ear centering and clamping function. In this slight modification of the invention each actuator member 74ª is equipped at its upper end with a head 93 having a plunger stem receiving bore 94 in its inner end, and a plunger receiving counterbore 95 extending through its other or inner end. A plunger 96 is slidable in and extended from the counterbore and carries an enlarged tappet head 97. The plunger is projected a limited distance from the head 93 by a compression spring 98, and the extent of this projection is determined by adjustable abutment and securing nuts 99. Stop pins 100 limit swinging movement of the crank member 72ª.

It will be obvious that as each actuator member 74ª moves in at given direction for engaging the respective lever roller 73ª to effect an opening or separation of the corn ear clamping devices as hereinbefore described, the plunger head 97 will engage and move said roller until the lever 72ª strikes the respective stop pin 100, at which time the corn ear clamping devices will have reached their fully opened or separated condition. Said member 74 continues to move a slight distance before commencing its retraction and during this continued movement the plunger is pressed back against the spring and said continued movement and also a like amount of movement of retraction of the member 74ª takes place without effecting any change in position of the lever arm 72ª. It will be obvious that during said like amount of movement of retraction, the spring 98 again projects the plunger 96 to its normal position illustrated in Figure 10, and by providing this yieldable plunger equipment the lever arm 72ª and the corn ear clamping devices actuated thereby are permitted to dwell during the interval referred to in the open or separated condition of said devices. It is to be understood of course that the plunger springs 98 have a value for dominating the spring devices constantly tending to close said clamping devices.

It is to be understood that the dimensions and specific arrangements of the cooperating elements may be variously altered to accommodate different conditions of use without departing from the scope of the invention as defined in the appended claims.

Having thus described the invention, what I claim as new and desire to secure by Letters-Patent is—

1. In a machine for cutting corn wherein is provided corn cutting means and means for forcing corn ears longitudinally to and through the cutting means; means for receiving and holding corn ears centered with relation to the cutting means and including opposed separable clamping elements and opposed independently movable supporting members one associated with each said element and cooperating with said elements in receiving and holding centered said corn ears, and means for positively causing each movement of a given clamping element or supporting member toward or from its opposed companion element or member to be accompanied by an identical degree of movement in an opposite direction of said opposed companion element or member whereby centered relation between said elements and members and the line of feeding movement of the corn ears always will be maintained, said last named means including a fixed bracket having a longitudinal slot therein disposed on a line intersecting said line of feeding movement, and a pair of actuator links having a mutual slide connection at one end in said slot and having individual connection at their other ends with an individual associated set of said opposed elements and members.

2. In a machine for cutting corn wherein is provided corn cutting means and means for forcing corn ears longitudinally to and through the cutting means, means for receiving and holding corn ears centered with relation to the cutting means and including opposed separable clamping elements for laterally centering the ear and independent opposed supporting members for vertically centering the ear, means including an actuator arm associated with each pair of clamping elements and supporting members associated therewith imparting like movements to each member of the pair, said means for forcing ears longitudinally including a pusher member passing longitudinally between said supporting members, linkage means extending across the vertical plane of reciprocation of the pusher and connecting said actuator arms to cause each movement of one actuator to be accompanied by a movement of like degree in the opposite direction of the other of said actuators whereby ears of different sizes are supported and guided by said clamping elements and supporting members so as to be centered laterally and vertically relative to the cutting means, means for positively separating the clamping elements and spring means for yieldingly moving the clamping elements and supporting members toward each other.

RALPH COVER.